Jan. 2, 1968   S. O. S. STARK   3,361,611
METHOD OF COVERING A STAMPED HOLE IN A LAMINATED PACKAGING
MATERIAL BY MEANS OF A WAFER OR THE LIKE, AND A PACKAGE
TO WHICH THE METHOD HAS BEEN APPLIED
Filed Feb. 24, 1966

INVENTOR
SVEN O. S. STARK
BY Earle R. Marden
ATTORNEY

United States Patent Office

3,361,611
Patented Jan. 2, 1968

3,361,611
METHOD OF COVERING A STAMPED HOLE IN A LAMINATED PACKAGING MATERIAL BY MEANS OF A WAFER OR THE LIKE, AND A PACKAGE TO WHICH THE METHOD HAS BEEN APPLIED
Sven Olof Soren Stark, Lund, Sweden, assignor to AB Tetra Pak, Lund, Sweden, a Swedish company
Filed Feb. 24, 1966, Ser. No. 529,799
Claims priority, application Sweden, Apr. 5, 1965, 4,331/65
4 Claims. (Cl. 156—252)

ABSTRACT OF THE DISCLOSURE

A method of heat sealing closed an opening in a laminated material which has a thermoplastic layer and a liquid sensitive layer. A thermoplastic strip is placed over the opening and is pressed therein in such a manner that when heat is applied to the thermoplastic layer of the laminated material the thermoplastic strip will adhere to the thermoplastic layer and cover the liquid sensitive layer.

---

The present invention refers to a method of covering a stamped hole in a laminated packaging material by means of a wafer or the like in such a way, that plastic material from the wafer is caused to adhere to a plastic layer which is spaced from the wafer by a fibrous or other liquid-sensitive layer.

More particularly, the method according to the invention is characterized by the fact that said wafer or the like is pressed by means of a resilient jaw, for example of rubber, into contact, on the one hand, with the packaging material in the region around the hole, on the other hand, through the hole with a heater jaw serving as a counter jaw, whereby plastic material from the wafer is caused at the supply of heat to adhere through the hole to said plastic layer, so that this layer together with the plastic material from the wafer forms a coninuous plastic layer.

Preferably, the invention is intended to be applied in the case of covering, by means of a removable strip or wafer, of the so-called eye in tetrahedral or similar packages, i.e. the stamped hole which is intended for introducing suction-pipes or straws or the like.

Figure 1:
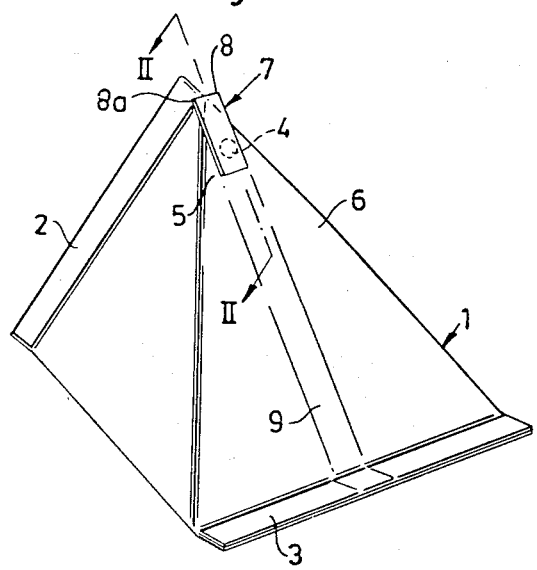
Figure 2:
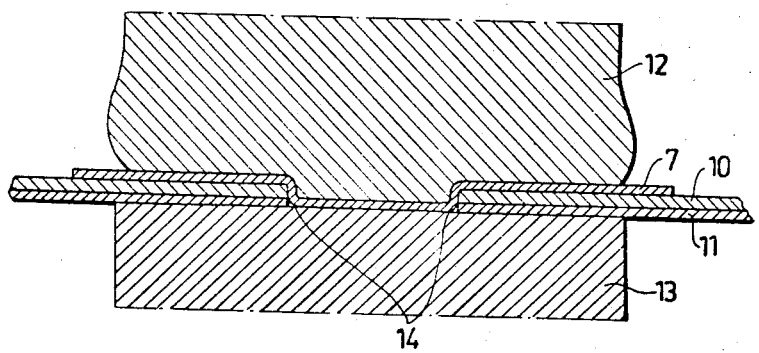

The invention will be described more closely in the following with reference to the accompanying drawings, in which:

FIGURE 1 shows, by way of example, a package to which the method according to the invention may be applied, while FIGURE 2 is intended, at an enlarged scale, to illustrate diagrammatically how the method may be applied in a practical example.

The tetrahedral package 1 shown in FIGURE 1 is formed in a manner known per se with sealing fins 2 and 3 and with a so-called eye or emptying aperture 4 at the top apex 5 of the wall designated by 6 in the figure. The eye 4 is sealed by means of a wafer or strip 7 which covers the eye 4 and is hermetically attached to the outside of the package within the region around the eye. An end portion 8 or at least one corner 8a of the strip 7 is not sealed on to the package proper. Thereby a vane-like pulling flap is produced which facilitates the removal of the strip when the package is to be emptied. The unsealed corner (or corners) of the end portion 8 projects from the package proper, whereby they may easily be discovered and seized by the one who is to use the package.

FIGURE 2 shows a section along the line II—II in FIGURE 1. However, since the eye 4 is not always placed at the very joint 9, one of the two plies of the packaging material included in the joint 9 has been omitted in FIGURE 2 so that the principle behind the invention will be understood generally. According to the invention, the wafer 7 is attached to the packaging material 10, 11 by being pressed by means of a yielding jaw 12 for example of rubber into contact, on the one hand, with the outer ply or layer 10 of the packaging material, said ply or layer consisting for example of paper, on the other hand, through the hole 4 with a heater jaw 13 serving as a counter jaw. Thereby, the wafer 7, which at least in respect of its inner side, i.e. the side facing the package, must consist of a heat sealing plastic, will also come into contact with the inner layer 11 of the packaging material, so that a heat seal is obtained around the periphery of the hole between the plastic from the wafer and the plastic of the inner layer 11. In this connection it is essential that the pressure and the current are applied in such sequence that the inner layer 11 will not have time by shrinkage to creep away from the cut edge of the hole 4. Preferably, the heater jaw 13 is heated for this purpose by impulse heat, i.e. by means of one or more short current pulses of high current strength, and only after a sufficient pressure has been established between the jaws 12 and 13. With a suitable pressure and suitable heat it has been found in practise that the plastic is also caused to fill the cavities designed by 14 in FIGURE 2, i.e. the package will get a completely smooth inner surface, consisting of a continuous plastic layer, closely around the hole. By the supply of heat taking place from the side which in the finished package forms the inner side, the advantage is moreover gained that the wafer 7 by the intermediate paper layer 10 is not caused to adhere more firmly to the outside of the package than to an extent which allows it to be easily removed at the emptying of the package. In the example shown, the wafer 7 consists of a single plastic layer. Naturally, however, it may also consist of a laminate for example of paper or regenerated cellulose and a heat sealing plastic. In respect of plastic materials, one may select for example some polyolefin, for example polyethylene or polypropylene. Preferably, the same material is chosen as for the inner layer 11 of the packaging material.

Obviously, the invention is only to the example described above, but may be varied within the scope of the following claims. Thus, for example, the outside of the packaging material may also be covered by further lamination layers for influencing the appearance or the functional characteristics of the package. Furthermore, the invention may of course also be applied to other kinds of packages than the tetrahedral package shown, for example to parallelepipedic or cylindrical packages.

Furthermore, the jaw 12 does not have to be made from rubber. Instead it may be a steel-jaw e.g., said jaw being provided with a recess opposite the hole which is to be covered, said recess is connected to a pressure source, providing an air-cushion serving as a resilient jaw.

That which is claimed is:

1. A method of sealing an aperture in a laminated packaging material having at least a thermoplastic layer and a liquid sensitive layer comprising the steps of forming an opening in said laminated material, placing a strip of thermoplastic material over said opening, pressing said strip of thermoplastic material against said packaging material and into said opening to a point where said strip of thermoplastic material contacts said thermoplastic layer of said packaging material, and applying heat to said thermoplastic strip of material on the side of said thermoplastic layer away from said liquid sensitive layer to cause said strip of thermoplastic material to adhere to said thermoplastic layer of said packaging material to form a continuous plastic layer.

2. The method according to claim 1 wherein said heating step comprises supplying impulse heat to said thermoplastic strip.

3. The method according to claim 2 wherein said impulse heat supplied is short current pulses of high current strength.

4. The method of claim 1 wherein said strip of thermoplastic material upon heating adheres to the area around said aperture as well as to said thermoplastic layer.

References Cited

UNITED STATES PATENTS 3,166,226  1/1965  Mobley _____ 229—7

DAVID M. BOCKENEK, *Primary Examiner.*